2,703,573

FLEXIBLE COATED SHEET MATERIAL

Homer A. Hamm, Park Ridge, Ill., assignor to General Bandages, Inc., Chicago, Ill., a corporation of Illinois No Drawing. Application December 28, 1951, Serial No. 263,979

8 Claims. (Cl. 128—156)

This invention relates to a flexible coated sheet material and the process for the manufacture thereof. More particularly it relates to a self-adhering bandage that is relatively non-adherent to human skin, and the process of making such a bandage.

Several forms of cohesive bandages of the character described have been marketed in the past, including those which have been made by impregnating a fabric, such as gauze, with a composition of unvulcanized rubber or rubber latex. Such bandages made with natural rubber possess a number of disadvantages, however, particularly with regard to the lasting qualities of impregnated rubber and its resistance to the deteriorating effect of hydrocarbons such as lubricating oils and the like.

In addition to these inherent disadvantages of natural rubber, a supply problem has developed at various times regarding natural rubber which made it desirable to develop a satisfactory substitute therefor.

It is therefore an object of this invention to provide a flexible sheet material coated with a synthetic plastic composition which is strongly self-cohesive, but at the same time is non-adherent to human skin.

Another object of this invention is to provide a bandage of the character described which retains its cohesive character even when exposed to the atmosphere for extended periods and which has a desirable soft texture, is non-irritating to a wound and is resistant to undesirable deterioration by contact with hydrocarbons, such as lubricating, penetrating or cutting oils.

Still another object is to provide a method or process of making a bandage, of the character described, which process produces a product of uniformly high quality in spite of its relative simplicity.

In accordance with this invention, a flexible base, such as a gauze cloth strip, coated with an emulsion of styrene latex and a suitable tackifier, which tackifier may be in the form of an emulsified solvent plasticizer or an emulsion of such a solvent plasticizer with a water dispersible polystyrene, styrene copolymer or morpholine stearate.

The term "tackifier" as used in this specification is meant to include compositions which when emulsified with styrene latex produce a composition which, when dried, retains the property of self-cohesion to a relatively high degree, but which is relatively non-adherent and free from stickiness with relation to other surfaces, such as human skin. The weight ratio of the tackifier to the styrene latex is between approximately 0.5 and 1.0.

The solvent plasticizers, which are preferable for use in the practice of my invention, are those which may be used as plasticizers for polystyrene, and the two most preferable have been found to be polyethylene glycol di-2 ethyl hexoate.

Other suitable plasticizers have been found to be triethylene glycol di-2 ethylbutyrate, di-2 ethylhexyl phthalate, disoctyl adipate, dioctyl adipate, monocresyl diphenyl phosphate, and alkyl aryl phosphate.

Any of the above named plasticizers may be used in the preferred form of the process which involves first the preparation of a plasticizer emulsion by dispersing the plasticizer in a viscous colloidal solution of a water dispersible polystyrene. This product may take the form of an alkali soluble styrene copolymer in the form of a finely ground (less than 40 mesh) hard, resin which reacts readily with ammonia or alkali metal hydroxides to form water soluble salts; which is a pigment dispersing agent, a protective colloid imparting freeze-thaw stability and resistance to coagulation to some emulsion systems; and which readily emulsifies film forming materials, usually by a simple cold stirring operation. The plasticizer emulsion so prepared is then added to a suitable styrene latex. The weight ratio of the plasticizer to the styrene latex may be between approximately 0.5 and 1.0.

The gauze or other fabric to be coated is first fed through a bath of the resultant composition of styrene latex and the tackifier so that a suitable coating is formed thereon. Upon leaving the coating bath, the coated gauze is preferably then passed through squeeze rolls and then, in order, through a coagulating bath, through a set of wringer rolls, through a cold water rinse, through an additional set of wringer rolls, and finally through a drying oven. The coated gauze is then preferably rolled into large rolls from which smaller rolls are subsequently formed and packaged. These packages are then preferably sterilized.

A second alternative process may be utilized in which the latex is combined with a water emulsion of one of several of the plasticizers listed above in a colloid mill. The plasticizers which have been found to be useful in this alternative process are triethylene glycol di-2 ethyl butyrate, polyethylene glycol di-2 ethyl hexoate, and monocresyl diphenyl phosphate.

The actual steps in this second process comprise first the emulsifying of the plasticizer in water, preferably in a colloid mill; emulsifying the styrene latex in the plasticizer so emulsified, also preferably in a colloid mill; feeding the gauze or other fabric through the resultant emulsified mixture; passing the coated gauze through a coagulating bath; and carrying out the additional steps listed above after the coagulating bath for the first described process. It will be noted that in this process the gauze, as it leaves the bath of coating material, is not passed through squeeze rolls, as in the case of the first described process, since difficulty would be encountered in build-up on these rolls. If it is found to be desirable, a doctor blade, or the like, can be utilized to aid in obtaining a proper type of coating on the gauze as it leaves the bath of emulsified material.

Still a third process may be utilized which differs primarily from the process first described in that the water dispersible polystyrene is replaced by morpholine stearate, although this type of coating is not capable of being coagulated. The steps therefore in this third process will not include the passage of the coated gauze through the coagulating bath, the wringer rolls, the cold water rinse, or the second set of wringer rolls, but it may be passed directly from the coating bath through a set of squeeze rolls and then directly through a drying oven.

The following examples are given as a further illustration of the invention:

Example I

A plasticizer emulsion or tackifier is first prepared by adding 6 milliliters of ammonium hydroxide to 150 milliliters of water at room temperature. To this is slowly added 15 gms. of a suitable styrene copolymer, with stirring, to form a viscous colloidal solution. To this solution is added, with stirring, 250 milliliters of polyethylene glycol di-2 ethyl hexoate (a solvent plasticizer); 8 parts of this plasticizer emulsion or tackifier is then added to 12 parts of styrene latex and thoroughly stirred. The resultant mixture is placed in a suitable bath through which gauze of preferably a 32 x 28 thread is fed at a rate such that on the finished product a solids weight on the fabric is obtained of approximately 24–45 gms. per square yard. This coated gauze is then passed continuously through a pair of squeeze rolls, in order to remove any excess of coating material and to more firmly coat the gauze. The gauze so coated is then passed through a coagulating bath of preferably 5% water solution of calcium nitrate, through a set of wringer rolls and then through a cold water rinse to remove any remaining calcium nitrate solution, through a second set of wringer rolls to remove any excess moisture, and then through a suitable drying oven to remove the remaining moisture. The resultant coated gauze is then rolled and packaged as desired and after packaging, may be sterilized by the application of heat.

Example II

To 10 gallons of polyethyl glycol di-2 ethyl hexoate, add 6 gallons of water run through a colloid mill for approximately 2 minutes, add 20 gallons of styrene latex run through a colloid mill not over 2 minutes. At the end of each ½ minute, drain the material in a valve well and replace in the tank of mill. The resultant mixture is placed in a suitable bath and the subsequent coating of the gauge or other fabric carried out as described in Example I except that a doctor blade is used in place of the squeeze rolls to remove excess coating material rather than the squeeze rolls.

Example III 100 parts, by weight, of polyethylene glycol di-2 ethyl hexoate is heated to approximately 200° F. Simultaneously 60 parts of water are brought to a boil and 6 parts of stearic acid added thereto. 2 parts of morpholine are subsequently added to form a soap (morpholine stearate) and the resultant solution is slowly added to the heated plasticizer, with constant agitation continued until the temperature of the resultant emulsion falls to 100° F. or less. The stirring is continued and 272 parts of styrene latex is added thereto. The resultant emulsion is then placed in a suitable container to form a bath through which a gauze is preferably 32 x 28 thread is fed and as the coated gauze is removed from the bath, it is passed through squeeze rolls to remove any excess coating material so that the finished product will have a solids weight on the fabric of approximately 25–45 gms. per square yard. The coated gauze is then passed directly through a suitably drying oven and the dried coated gauze is then rolled and suitably packaged, and the packages may then be sterilized by the application of heat, if desired.

In the specification there has been set forth a preferred embodiment of the invention and although specific terms are employed, they are used in a generic and descriptive sense only and not for purposes of limitation.

It is claimed:

1. A self-adhering bandage relatively non-adherent to human skin comprising a strip of fabric coated with an emulsion of styrene latex and a tackifier, said tackifier consisting essentially of an emulsion of polystyrene and a solvent plasticizer, the weight ratio of the tackifier to the styrene latex being between approximately 0.5 and 1.0.

2. A self-adhering bandage relatively non-adherent to human skin comprising a strip of fabric coated with an emulsion of styrene latex and a tackifier, said tackifier consisting essentially of an emulsion of a styrene copolymer and a solvent plasticizer, the weight ratio of the tackifier to the styrene latex being between approximately 0.5 and 1.0.

3. A self-adhering bandage relatively non-adherent to human skin comprising a strip of fabric coated with an emulsion of styrene latex and a tackifier, said tackifier consisting essentially of an emulsion of polystyrene and polyethylene glycol di-2 ethyl hexoate, the weight ratio of the tackifier to the styrene latex being between approximately 0.5 and 1.0.

4. A self-adhering bandage relatively non-adherent to human skin comprising a strip of fabric coated with an emulsion of styrene latex and a tackifier, said tackifier consisting essentially of an emulsion of polystyrene and di butoxy ethyl phthalate, the weight ratio of the tackifier to the styrene latex being between approximately 0.5 and 1.0.

5. A self-adhering bandage relatively non-adherent to human skin comprising a strip of fabric coated with an emulsion of styrene latex and an emulsified solvent plasticizer selected from the group consisting of triethylene glycol di-2 ethylbutyrate, polyethylene glycol di-2 ethyl hexoate, monocresyl diphenyl phosphate, and alkyl aryl phosphate, and the weight ratio of the solvent plasticizer to the styrene latex being between approximately 0.5 and 1.0.

6. A self-adhering bandage relatively non-adherent to human skin comprising a strip of fabric coated with an emulsion of styrene latex and a tackifier, said tackifier consisting essentially of an emulsion of morpholine stearate and a solvent plasticizer, the weight ratio of the tackifier to the styrene latex being between approximately 0.5 and 1.0.

7. A self-adhering bandage relatively non-adherent to human skin comprising a strip of fabric coated with an emulsion of styrene latex and a tackifier, said tackifier consisting essentially of an emulsion of morpholine stearate and polyethylene glycol di-2 ethyl hexoate, the weight ratio of the tackifier to the styrene latex being between approximately 0.5 and 1.0.

8. A self-adhering bandage relatively non-adherent to human skin comprising a strip of fabric coated with an emulsion of styrene latex and a tackifier, said tackifier consisting essentially of an emulsion of morpholine stearate and di butoxy ethyl phthalate, the weight ratio of the tackifier to the styrene latex being between approximately 0.5 and 1.0.

References Cited in the file of this patent

UNITED STATES PATENTS

| Number | Name | Date |
| --- | --- | --- |
| 2,082,599 | Sawyer | June 1, 1937 |
| 2,371,001 | Stone | Mar. 6, 1945 |
| 2,378,186 | Clark | June 12, 1945 |
| 2,441,523 | Ward | May 11, 1948 |

FOREIGN PATENTS

| Number | Country | Date |
| --- | --- | --- |
| 597,168 | Great Britain | Jan. 20, 1948 |

UNITED STATES PATENT OFFICE
CERTIFICATE OF CORRECTION

Patent No. 2,703,573 March 8, 1955

Homer A. Hamm

It is hereby certified that error appears in the printed specification of the above numbered patent requiring correction and that the said Letters Patent should read as corrected below.

Column 1, line 66, after "hexoate" strike out the period and insert instead --, and di butoxy ethyl phthalate.--; column 3, line 10, for "gauge" read --gauze--.

Signed and sealed this 5th day of April, 1955.

(SEAL)
Attest:
E. J. MURRY

Attesting Officer

ROBERT C. WATSON
Commissioner of Patents